United States Patent [19]
Kushida et al.

[11] Patent Number: 4,843,877
[45] Date of Patent: Jul. 4, 1989

[54] ACCELERATION SENSOR

[75] Inventors: Takeo Kushida; Susumu Taira; Wataru Nagasaki; Hajime Muramatsu; Toshikazu Sakakibara, all of Higashimatsuyama, Japan

[73] Assignee: Diesel Kiki Co., Ltd., Japan

[21] Appl. No.: 113,180

[22] Filed: Oct. 23, 1987

[30] Foreign Application Priority Data

| Oct. 28, 1986 | [JP] | Japan | 61-254788 |
| Dec. 8, 1986 | [JP] | Japan | 61-290559 |
| Dec. 17, 1986 | [JP] | Japan | 61-193159[U] |
| Jan. 7, 1987 | [JP] | Japan | 62-000321[U] |
| Feb. 18, 1987 | [JP] | Japan | 62-021332[U] |
| Jul. 14, 1987 | [JP] | Japan | 62-173994 |

[51] Int. Cl.$^4$ .................................... G01P 15/11
[52] U.S. Cl. ................. 73/517 R; 73/516 R; 73/654
[58] Field of Search ............ 73/516 R, 517 R, 654; 336/30; 340/669, 689; 200/61.45 M

[56] References Cited

U.S. PATENT DOCUMENTS

| 2,979,959 | 4/1961 | Clurman | 73/516 R |
| 3,100,292 | 8/1963 | Warner et al. | 73/517 R |
| 4,311,051 | 1/1982 | Eon et al. | 73/517 R |
| 4,365,513 | 12/1982 | Iwasaki | 73/517 R |

Primary Examiner—John Chapman
Attorney, Agent, or Firm—Kane, Dalsimer, Sullivan, Kurucz, Levy, Eisele and Richard

[57] ABSTRACT

An acceleration sensor comprises a case having defined therein at least one accommodating chamber. At least one magnetic ball is accommodated in the accommodating chamber with a radial play left between the wall surface of the accommodating chamber and the magnetic ball. The magnetic ball is magnetically attracted to a reference position in the accommodating chamber by a magnetic field generating unit. In response to acceleration, deceleration or inclination, the magnetic ball is movable in the accommodating chamber against the attracting force of the magnetic field generating unit. The movement of the magnetic ball is detected by a detector.

24 Claims, 7 Drawing Sheets

ACCELERATION SENSOR

BACKGROUND OF THE INVENTION

The present invention relates to a sensor for detecting acceleration, inclination and the like of a moving body.

An acceleration sensor has been developed by the same applicant as the present application, as is disclosed, for example, in Japanese Patent Laid-Open Application No. 60-233564. In the sensor, magnetic fluid is sealingly enclosed within an accommodating chamber defined in a tubular case. Arranged on the outside of the case is magnetic field generating means such as a permanent magnet for magnetically attracting the magnetic fluid to a reference position. Detecting coil means is also arranged on the outside of the case. In use, the sensor is mounted, for example, on a moving body. As the magnetic fluid is displaced or deformed in response to acceleration of the moving body, against the magnetic force generated by the magnetic field generating means, the displacement or deformation is detected as a change in inductance of the detecting coil means.

However, the magnetic fluid of the sensor, which consists of a solvent and fine or minute magnetic particles dispersed in the solvent, is not so much in content of magnetic material. Therefore, the magnetic fluxes generated in the magnetic fluid are small in number, and a change in inductance of the detecting coil means due to the displacement or deformation of the magnetic fluid is small. This necessitates considerably high amplification of the change in inductance by an amplifier, and it is difficult to accurately detect the change in inductance.

Further, since the magnetic fluid contains only a small quantity of magnetic material, force is weak with which the magnetic fluid is attracted by the magnetic field generating means. Therefore, relatively low acceleration causes the magnetic fluid to reach its limit positions within the accommodating chamber, so that a range of acceleration capable of being detected is narrow.

Moreover, a part of the magnetic fluid might not move in response to a change in acceleration, but remain adhered to the inner peripheral surface of the case. The magnetic fluid part remaining adhered would cause a variation in the detection output, and deteriorate the reproducibility.

As the prior art, there are Japanese Patent Laid-Open Application Nos. 60-133370, 60-203861, 60-252271, 61-62870, 61-167869 and 61-212713, and Japanese Utility Model Laid-Open Application Nos. 61-38564, 61-38565 and 61-50270, all of which have been filed in the name of the same applicant as the present application.

It is to be noted that U.S. Ser. No. 714,898 filed on Mar. 22, 1985, based on the above-mentioned Japanese Patent Laid-Open Application No. 60-203861 and Japanese Patent Laid-Open Application No. 60-233564 has been abandoned. The corresponding West German Patent Application No. P 35 10 987.4 filed on Mar. 25, 1985 has been published for opposition purposes on Apr. 16, 1987 as Publication No. DE 35 10 987C2.

As another prior art, there are U.S. Pat. Nos. 3,516,294, 4,047,439, 3,550,457, and 3,164,997, U.S.S.R. Pat. No. 605,180, Japanese Utility Model Laid-Open Application Nos. 50-31954 and 58-27772, and Japanese Patent Laid-Open Application No. 57-72067.

SUMMARY OF THE INVENTION

It is an object of the present invention to provide an acceleration sensor by which highly accurate detection is made possible, which is superior in reproducibility and responsibility, and which can widen a detection range of acceleration as occasion demands.

According to the invention, there is provided an acceleration sensor comprising:

a tubular case having an inner surface defining an accommodating chamber;

at least one magnetic ball accommodated in the accommodating chamber with a radial play left between the magnetic ball and the inner surface of the case, the magnetic ball being movable axially of the case in point contact with the inner surface thereof;

magnetic field generating means arranged on the outside of the case for magnetically attracting the magnetic ball to a reference position; and detection means arranged on the outside of the case for detecting a position of the magnetic ball.

DETAILED DESCRIPTION

Various embodiments of the invention will be described in detail with reference to the accompanying drawings.

Figure 1:
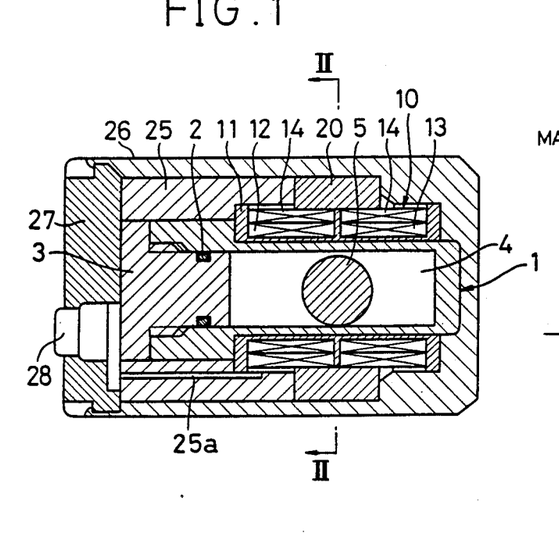
FIG. 1 is a longitudinal cross-sectional view showing a first embodiment of an acceleration sensor according to the invention.

Referring first to FIG. 1, there is illustrated an acceleration sensor according to a first embodiment of the invention, which comprises a case 1. The case 1 is cylindrical in shape and has one closed end and the other open end which is closed by a plug 3 having fitted thereabout an O-ring 2, to define a closed accommodating chamber 4 within the case 1. The accommodating chamber 4 is circular in cross-section and extends axially of the case 1. The accommodating chamber 4 may be filled with fluid such as air, oil or the like, or may be negative in pressure or vacuum.

A magnetic ball 5 formed of, for example, iron is accommodated in the accommodating chamber 4. The magnetic ball 5 has a diameter slightly smaller than an inner diameter of the case 1 and has a radial play within the accommodating chamber 4. Thus, the magnetic ball 5 is in contact with an inner peripheral surface of the case 1 at a single point, so that the magnetic ball 5 can roll and slide axially of the case 1.

Arranged about an outer peripheral surface of the case 1 is a differential transformer 10 serving as detecting means. The differential transformer 10 comprises a bobbin 11, a pair of secondary coils 12 and 13 wound respectively around left and right halves of the bobbin 11, and primary coils 14 and 14 uniformly wound respectively around the secondary coils 12 and 13. A boundary between the secondary coils 12 and 13 is located at an axial center of the accommodating chamber 4 to provide a reference position for the magnetic ball 5.

Figures 2, 3:
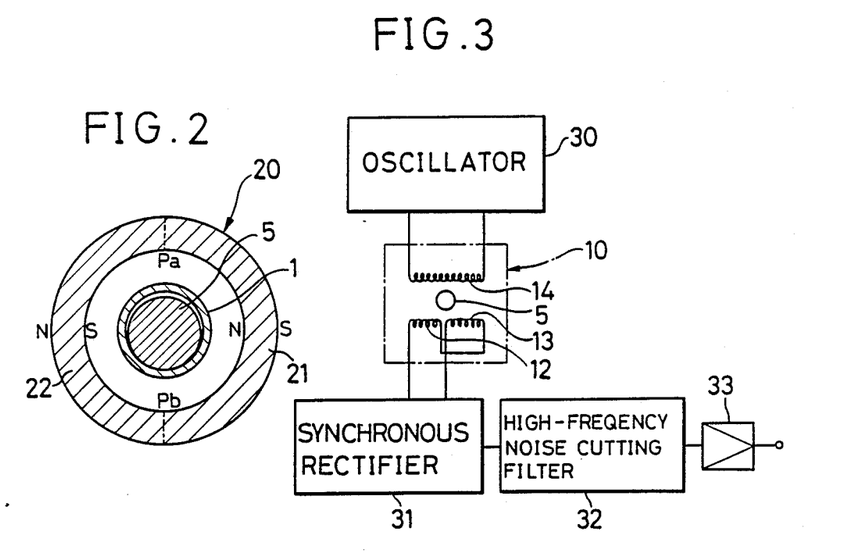
FIG. 2 is a cross-sectional view taken along line II—II in FIG. 1, with a housing and detecting coil means omitted.
FIG. 3 is a block diagram of an electric circuit for use with the acceleration sensor illustrated in FIG. 1.

Arranged about an outer periphery of the differential transformer 10 is an annular permanent magnet 20 serving as magnetic field generating means. An axial center of the magnet 20 is coincident with the boundary between the secondary coils 12 and 13, i.e., with the reference position, so that the permanent magnet 20 attracts the magnetic ball 5 to the reference position. As shown in FIG. 2, the magnet 20 has two magnetization regions 21 and 22 which are magnetized radially, but are opposite to each other in their respective positions of magnetic poles N and S. Specifically, one magnetization region 21 has N pole on the inside and S pole on the outside, while the other magnetization region 22 has S pole on the inside and N pole on the outside.

The case 1, the differential transformer 10 and the permanent magnet 20 are accommodated, together with a tubular spacer 25, in a housing 26, and are covered by a closure 27. The above-mentioned case 1, plug 3 and bobbin 11 are formed of a nonmagnetic material, while the spacer 25, housing 26 and closure 27 are formed of a soft magnetic material.

A connector 28 is inserted through and secured to the closure 27. The spacer 25 is formed with an axial bore 25a through which lead wires (not shown) pass to electrically connect the differential transformer 10 and the connector 28 to each other. Thus, the differential transformer 10 is electrically connected to an electric circuit shown in FIG. 3, through the lead wires and the connector 28. Specifically, the primary coil 14 of the differential transformer 10 is connected to an oscillator 30, and is supplied with high-frequency alternating voltage from the oscillator 30. A differential output from the secondary coils 12 and 13 is synchronously rectified by a synchronous rectifier 31. An output from the synchronous rectifier 31 has components corresponding to the high frequency from the oscillator 30, which components are cut off by a high-frequency noise cutting filter 32. An output from the filter 32 is sent to an amplifier 33 and is amplified thereby. An output from the amplifier 33 is sent to a digital display, control means effecting a controlling operation based on information of the detected acceleration, or any other means.

The sensor constructed as described above is adapted to be mounted on a moving body (not sown) which is a subject to be measured, to detect acceleration of the moving body. Specifically, when the moving body is not in a accelerated state, the magnetic ball 5 is attracted by the magnetic force of the magnet 20, and is in the axial center of the accommodating chamber 4 within the case 1, i.e., in the reference position. Accordingly, the output from the differential transformer 10 is zero.

As the moving body is accelerated rightward or leftward as viewed in FIG. 1, the magnetic ball 5 is subjected to inertia force in a direction opposite to the acceleration direction, and is moved against the magnetic force of the permanent magnet 20. Such movement or a change in position of the magnetic ball 5 causes a differential output to occur at the differential transformer 10. As mentioned previously, the differential output is synchronously rectified, the high-frequency noise of the differential output is cut off and, subsequently, the output is amplified. The thus obtained output contains information on the direction and magnitude of the acceleration.

The magnetic ball 5 is, in whole, formed of magnetic material and is ten times or more in the content of magnetic material as compared with the magnetic fluid. Therefore, the magnetic fluxes generated are much in number, so that a change in inductance of the differential transformer 10 at the acceleration is large, making it possible to increase the output from the differential transformer 10. This avoids the necessity of unreasonably increasing the amplification rate of the amplifier 33, so that the detection accuracy can be improved.

The magnetic ball 5 is in contact with the inner peripheral surface of the case 1 at only a single point, and can roll and slide without being subjected to any adhesion resistance, unlike the magnetic fluid. Thus, the magnetic ball 5 can quickly be displaced in response to acceleration or deceleration, so that the response ability can be improved.

Because of the use of the magnetic ball 5, no such situation occurs that a part of the magnetic fluid remains adhered to the inner peripheral surface of the case, as discussed previously with reference to the prior art. Thus, a variation in the detection output is eliminated, making it possible to improve the ability to repeatedly obtain the same output with respect to the same acceleration.

The two magnetization regions 21 and 22 of the permanent magnet 20 are opposite to each other in their respective magnetic pole positions, so that it is possible to generate high gradient magnetic fields on the inside of the permanent magnet 20, centering respectively around boundaries Pa and Pb between the magnetization regions 21 and 22. Further, since the magnetic ball 5 is contains much of the magnetic material as described previously, the force is strong with which the magnetic ball 5 is attracted to the reference position by the permanent magnet 20. Therefore, by reducing the movement of the magnetic ball 5 in response to acceleration, it can easily be realized from the design point of view to widen the range of acceleration capable of being detected.

Moreover, the fact that the magnetic force biasing the magnetic ball 5 toward the reference position is strong is equivalent, if compared to a spring-mass system, to an increase in the spring strength. Therefore, the resonance frequency becomes high. Thus, if the acceleration sensor is applied to detection of acceleration due to vibration, it is possible to reduce the gain due to the resonance and the phase delay over a wide range of frequency, so that the frequency characteristic can be improved.

Figure 4:
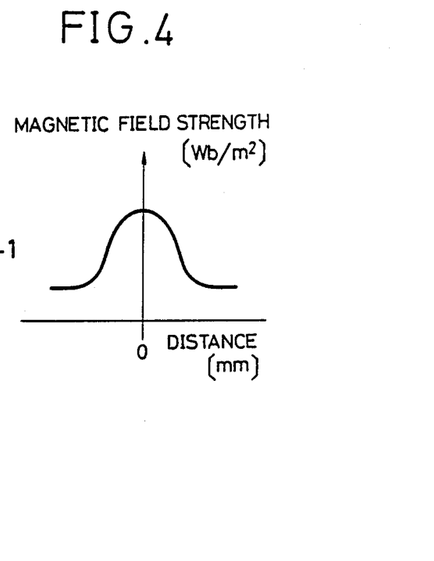
FIG. 4 is a graphical representation of the relationship between positions along an axis of a case and magnetic field strength of a permanent magnet in the acceleration sensor illustrated in FIG. 1.

As shown in FIG. 4, the magnetic field strength of the permanent magnet 20 as measured along the axis of the case 1 peaks at the reference position, and gradually decreases in a symmetrical fashion as a distance from the reference position toward the opposite ends of the case 1 increases. Further, the magnetic ball 5 is not uniform in a cross-sectional diameter in a plane perpendicular to the axis of the case 1. The cross-sectional diameter of the magnetic ball 5 is maximum at the center thereof, and gradually decreases in a symmetrical fashion as a distance from the center of the magnetic ball 5 toward the opposite ends of the case 1 increases. Thus, the magnetic ball 5 is most strongly affected at the center thereof by the magnetic field. As a consequence, it can be ensured that the center of the magnetic ball 5 is returned to the reference position when acceleration reaches zero, thereby making it possible to detect the acceleration with good reproducibility and with high accuracy, even in a low acceleration range.

The permanent magnet 20 may be composed of a plurality of pieces having their respective magnetization regions different from each other.

FIGS. 5 through 23 show second to twelfth embodiments of the invention. In these figures, like or similar reference numerals are used to designate like or similar parts and components to those shown in FIG. 1, and the description of such like or similar parts and components will therefore be omitted to avoid duplication. In FIGS. 5 through 23, a housing corresponding to the housing 26 shown in FIG. 1 will also be omitted to simplify the illustration.

Figure 5:
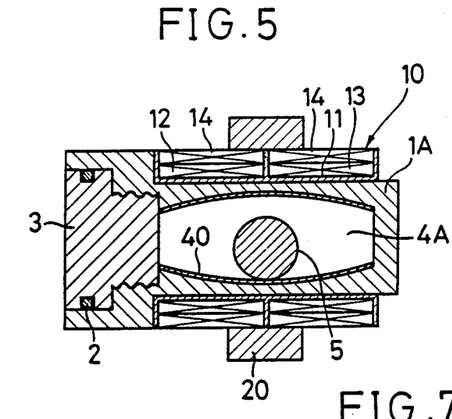
FIG. 5 is a view similar to FIG. 1, but showing a second embodiment of the invention, with a housing omitted.
Figure 6:
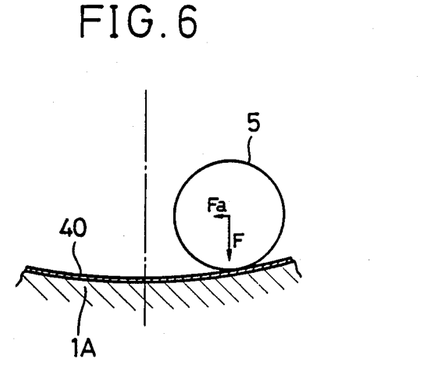
FIG. 6 is a fragmental enlarged view for explanation of the principle of operation of the acceleration sensor illustrated in FIG. 5.

FIG. 5 illustrates the second embodiment of the invention, which is different from the above-described first embodiment shown in FIG. 1 in the configuration of an inner peripheral surface of a case 1A defining an accommodating chamber 4A. That is, the accommodating chamber 4A is maximum in diameter at the reference position, and gradually decreases in diameter as a distance from the reference position toward the opposite ends of the case 1A increases. Thus, the inner peripheral surface of the case 1A is curved into an arcuate form in a plane containing the axis of the case 1A. In addition, the inner peripheral surface of the case 1A is coated with a thin film 40 formed of a low friction material such as molybdenum disulfide, polytetrafluoroethylene or the like. With the arrangement illustrated in FIG. 5, the magnetic ball 5 is subjected to an axial magnetic force and a radial magnetic force by the permanent magnet 20. The axial magnetic force is weak in the vicinity of the reference position. In the embodiment illustrated in FIG. 5, however, since the inner peripheral surface of the case 1A is curved in the plane containing the axis of the case 1A as clearly shown in FIG. 6, a vector component Fa along the curved surface occurs in the radial magnetic force F. The vector component Fa serves, together with the axial magnetic force, as a force to return the magnetic ball 5 toward the reference position. Accordingly, it can be ensured that even if the acceleration decreases from the low acceleration range and reaches zero, the magnetic ball 5 is returned to the reference position. Thus, the reproducibility in the vicinity of the reference position can further be improved. Moreover, the thin film 40 of molybdenum disulfide or polytetrafluoroethylene causes the magnetic ball 5 to tend to slide. This also makes it easy that the magnetic ball 5 returns to the reference position when the acceleration reaches zero. The inner peripheral surface of the case 1A may be inclined linearly, in a symmetrical manner, from the reference position toward the opposite ends of the case 1A in the plane containing the axis thereof, or may be curved or inclined only in the vicinity of the reference position.

Figure 7:
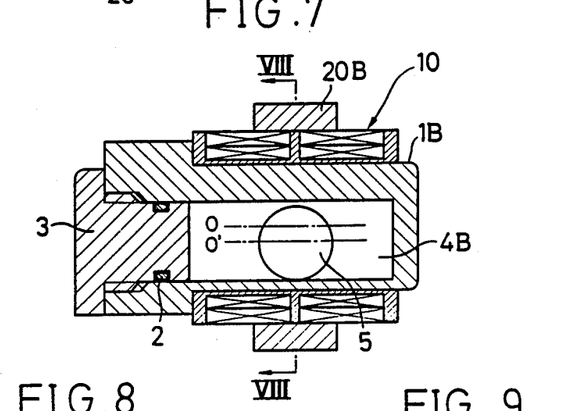
FIG. 7 is a view similar to FIG. 1, but showing a third embodiment of the invention, with a housing omitted.
Figure 8:
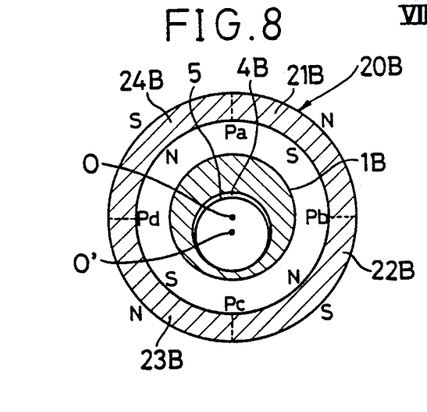
FIG. 8 is a cross-sectional view taken along line VIII—VIII in FIG. 7, with detecting coil means omitted.

FIGS. 7 and 8 show the third embodiment of the invention, in which a permanent magnet 20B has four magnetization regions 21B to 24B. Each pair of adjacent magnetization regions are opposite to each other in their respective magnetic pole positions. Magnetic fields are high in gradient at boundaries Pa to Pd between the magnetization regions 21B to 24B. The magnetic ball 5 has a radial play within an accommodating chamber 4B, and a region within which the magnetic ball 5 is movable radially is equal to a cross-sectional area of the accommodating chamber 4B. However, the magnetic ball 5 is subjected to the following restriction in radial movement. That is, the radial wall thickness of the case 1B is not uniform, but is thinnest on the lower side as viewed in FIG. 8 and gradually increases toward the lateral sides and the upper side. The radial wall thickness of the case 1B is thickest on the upper side. As a result, the central axis O' of the accommodating chamber 4B is displaced downwardly from the center of the outer peripheral surface of the case 1B, i.e, the central axis O of the permanent magnet 20B. Therefore, the magnetic ball 5 is most strongly attracted to the downwardly positioned boundary Pc of the four boundaries Pa to Pd, and is seated on the lower side of the inner peripheral surface of the case 1B. Accordingly, as far as there is no strong radial vibration, the seating position of the magnetic ball 5 with respect to the inner peripheral surface of the case 1B is specified to the lower side thereof and does not oscillate laterally. Thus, the magnetic ball 5 can effect stable movement. Further, even if the magnetic fields at the respective boundaries Pa to Pd are different in gradient from each other, what applies the strongest magnetic force to the magnetic ball 5 is a specific one of the magnetic field strengths, so that the magnetic force of the permanent magnet 20B does not fluctuate with respect to a position of the magnetic ball 5. Thus, it is possible to always make constant the position of the magnetic ball 5 where the magnetic force of the permanent magnet 20B and the inertia force due to acceleration are to be balanced with each other. As a result, it can further be ensured that the acceleration is detected with good reproducibility.

Figure 9:
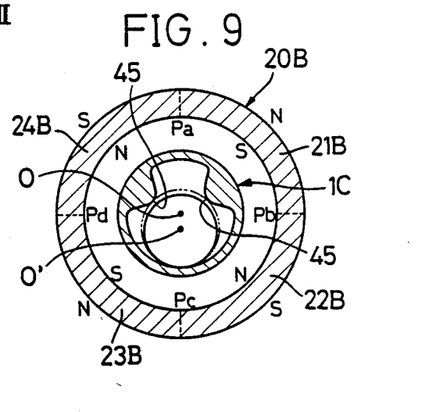
FIG. 9 is a view similar to FIG. 8, but showing a fourth embodiment of the invention.

The fourth embodiment shown in FIG. 9 can obtain functional advantages similar to those of the third embodiment illustrated in FIGS. 7 and 8. Specifically, two ridges 45 and 45 extending axially are formed at an upper portion of the inner peripheral surface of the case 1C, to restrict the upward movement of the magnetic ball 5. In the embodiment, an area indicated by the phantom line in FIG. 9 represents an area within which the magnetic ball 5 is movable radially. The central axis O' of this area is displaced downwardly from the central axis O of the permanent magnet 20B. Thus, the magnetic ball 5 is strongly attracted to the lower boundary Pc o the magnet 20B.

Figure 10:
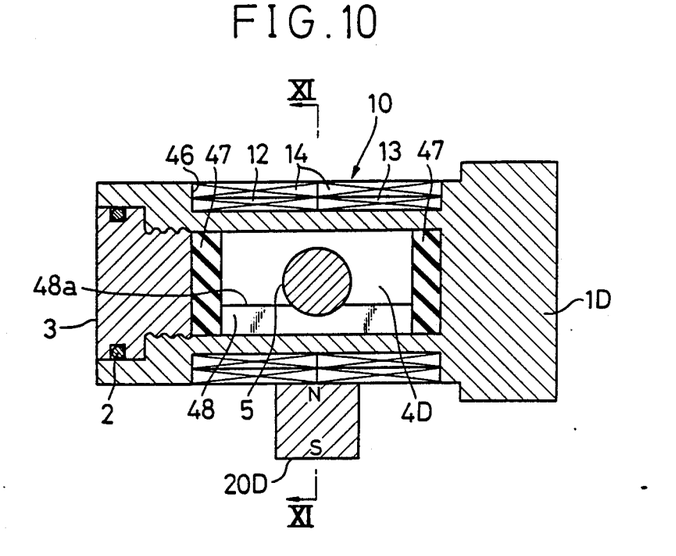
FIG. 10 is a view similar to FIG. 1, but showing fifth embodiment of the invention, with a housing omitted.
Figure 11:
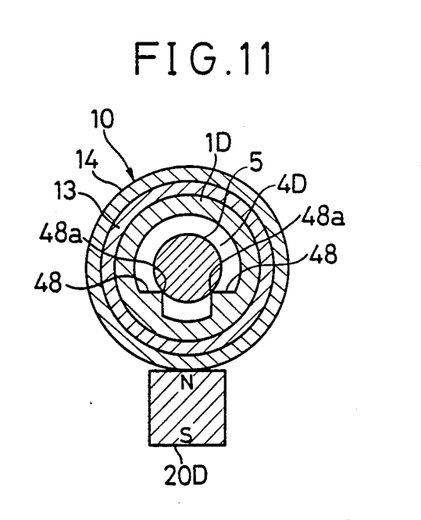
FIG. 11 is a cross-sectional view taken along line XI—XI in FIG. 10.

FIGS. 10 and 11 show the fifth embodiment of the invention, in which the differential transformer 10 is accommodated in an annular circumferential recess 46 formed in an outer peripheral surface of a case 1D. A pair of shock absorbing members 47 and 47 formed of rubber or the like are disposed respectively at opposite ends of an accommodating chamber 4D defined in the case 1D. When the magnetic ball 5 is subjected to strong inertia force due to high acceleration, the magnetic ball 5 impinges against one of the shock absorbing members 47 and the shook is relieved thereby, to prevent damages to the case 1D and the plug 3. It is needless to say that the shock absorbing members 47 and 47 are applicable to the embodiments described above and the embodiments subsequently to be described.

Another important features of the fifth embodiment illustrated in FIGS. 10 and 11 are that a permanent magnet 20D is not annular in configuration, but merely occupies a circumferentially partial region of the outer periphery of the case 1D, and that a pair of ridges 48 and 48 extending axially are formed at an axially extending portion of the inner peripheral surface of the case 1D adjacent the permanent magnet 20D so that the accommodating chamber 4D has its non-circular cross-section. The permanent magnet 20D is magnetized radially of the case 1D such that the permanent magnet 20D has N pole on the side adjacent the case 1D, and S pole on the opposite side. Each of the ridges 48 is triangular in cross-section, and has a ridgeline 48a serving to support the magnetic ball 5. With the arrangement illustrated in FIGS. 10 and 11, the magnetic ball 5 is always attracted downwardly as viewed in these figures, by the permanent magnet 20D, and is in point contact with the ridgelines 48a and 48a of the respective ridges 48 and 48. Thus, the magnetic ball 5 is prevented from moving radially and from moving circumferentially along the inner peripheral surface of the case 1D, but moves only axially. In this manner, the locus of movement of the magnetic ball 5 is constant, so that stable detection of acceleration is possible and the reproducibility is improved. The cross-sectional area of each of the ridges 48 may vary along the axis of the case 1D so as to have the corresponding ridgeline 48a curved or inclined such that the longitudinal center of the ridgeline 48a is nearest to the permanent magnet 20D.

Figure 12:
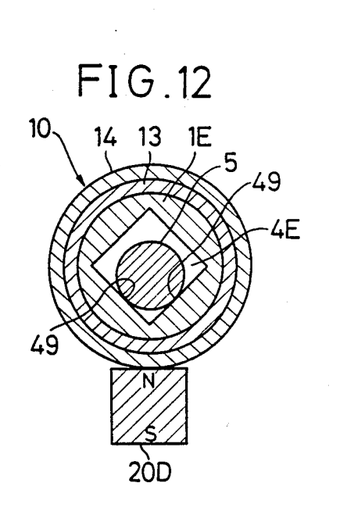
FIG. 12 is a view similar to FIG. 11, but showing a sixth embodiment of the invention.

FIG. 12 shows the sixth embodiment of the invention which can obtain functional advantages similar to those of the fifth embodiment illustrated in FIGS. 10 and 11. The sixth embodiment is different from the fifth embodiment only in that no ridges are formed on an inner surface of a case 1E, but an accommodating chamber 4E having a square cross-sectional shape is defined in the case 1E. The magnetic ball 5 is in point contact with a pair of adjacent flat planes of the inner surface of the case 1E adjacent the permanent magnet 20D. Axially extending lines 49 and 49, along which the magnetic ball 5 is in point contact with the inner surface of the case 1E, serve to support the magnetic ball 5.

Figure 13:
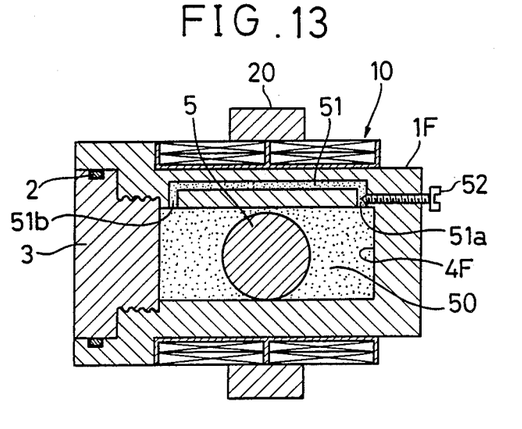
FIG. 13 is a view similar to FIG. 1, but showing a seventh embodiment of the invention, with a housing omitted.

FIG. 13 shows the seventh embodiment of the invention, in which an accommodating chamber 4F defined within a case 1F is filled with damping liquid 50. A bypass passage 51 extending axially is formed in a peripheral wall of the case 1F. The bypass passage 51 has its opposite end portions 51a and 51b which are bent and open respectively at opposite ends of the accommodating chamber 4F. An adjust screw 52 is screwed into the case 1F and has a forward end which projects into one of the end portions 51a of the bypass passage 51. In the illustrated embodiment, the damping liquid 50 serves as resistance against movement of the magnetic ball 5 to prevent the same from being reciprocated by high frequency vibration. When the magnetic ball 5 moves in response to a change in acceleration or inclination, the damping liquid 50 also moves following the magnetic ball 5. During movement of the magnetic ball 5, the damping liquid 50 flows not only through a gap between the inner peripheral surface of the case 1F and the magnetic ball 5, but also through the bypass passage 51, so that good response can be retained. Further, since the cross-sectional communication area of the bypass passage 51 can be adjusted by the adjust screw 52, it is possible to easily obtain desirable response, and it is possible to set a range of frequency capable of being detected, with respect to vibration.

Figure 14:
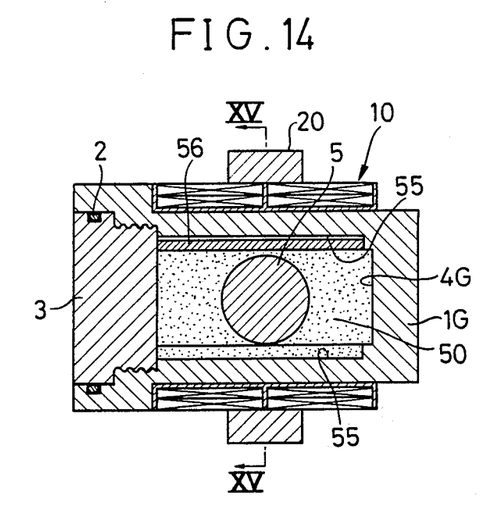
FIG. 14 is a view similar to FIG. 1, but showing eighth embodiment of the invention, with a housing omitted.
Figure 15:
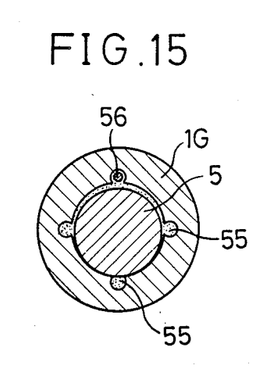
FIG. 15 is a cross-sectional view taken along line XV—XV in FIG. 14, with detecting coil means and a permanent magnet omitted.

FIGS. 14 and 15 show the eighth embodiment of the invention, in which an accommodating chamber 4G defined within a case 1G is filled with the damping liquid 50. The case 1G has a peripheral wall formed with a plurality of bypass passages 55 communicating with the accommodating chamber 4G. Inserted in at least one of the bypass passages 55 is a rod 56 to fill up the at least one selected bypass passage 55. Selection of the number of the bypass passages 55, which is or are filled up by the rod or rods 56, enables adjustment of the cross-sectional communication area for the damping liquid 50. Thus, desirable response can be obtained. Further, if it is desired to detect vibration, it is possible to set a range of frequency to be detected.

In the embodiments illustrated in FIGS. 13 through 15, a portion of each of the bypass passages may be formed by a pipe connected to the case.

Figure 16:
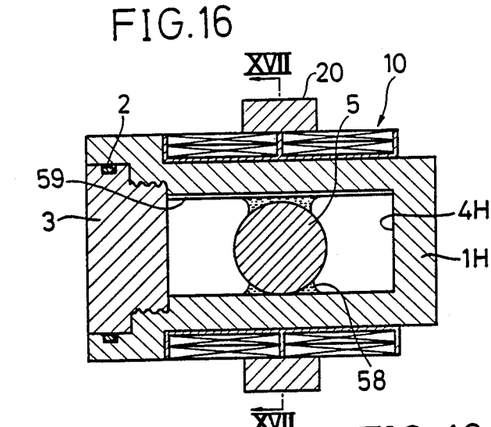
FIG. 16 is a view similar to FIG. 1, but showing a ninth embodiment of the invention, with a housing omitted.
Figure 17:
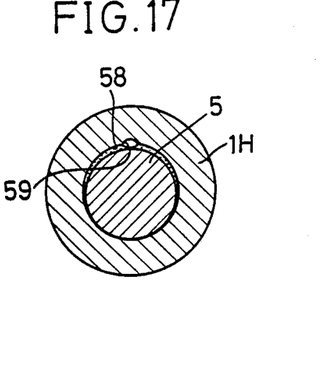
FIG. 17 is a cross-sectional view taken along line XVII—XVII in FIG. 16, with detecting coil means and a permanent magnet omitted.

FIGS. 16 and 17 show the ninth embodiment of the invention, in which oil 58 such as silicone oil or the like having appropriate surface tension and lubricating ability is interposed between an inner peripheral surface of a case 1H and the magnetic ball 5. The oil 58 moves following the magnetic ball 5. The oil 58 is filled in a narrow gap between the inner peripheral surface of the case 1H and the magnetic ball 5, so that an accommodating chamber 4H is divided into two compartments. A gas communication groove 59 extending axially and having a semi-circular cross-section is formed in the inner peripheral surface of the case 1H. The gas communication groove 59 has a cross-sectional communication area less than that of the gap between the inner peripheral surface of the case 1H and the magnetic ball 5. Gas such as air, inert gas or the like filled in the accommodating chamber 4H flows through the gas communication groove 59. Damping effects are obtained by flow resistance during passage of the gas through the gas communication groove 59. Accordingly, frequency characteristic with respect to vibration is determined by the cross-sectional area of the gas communication groove 59. In FIGS. 16 and 17, the gap between the case 1H and the magnetic ball 5 and the gas communication groove 59 are illustrated exaggeratedly for ease of understanding.

Figure 18:
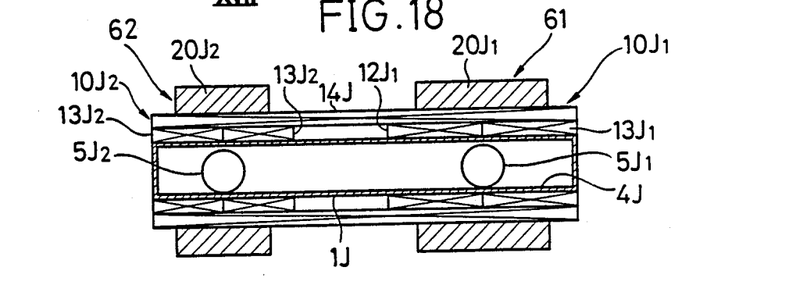
FIG. 18 is a longitudinal cross-sectional view showing a tenth embodiment of an acceleration sensor according to the invention, which comprises two sensor units, with a housing omitted.

FIG. 18 shows the tenth embodiment of the invention which is designed to detect vibration in a wide range of frequency. Specifically, a case 1J has its length longer than the cases in all of the embodiments described previously. A pair of first and second sensor units 61 and 62 are arranged respectively at right and left hand portions of the case 1J. Like the above-mentioned embodiments, each of the sensor units 61, 62 comprises a magnetic ball $5J_1$, $5J_2$ accommodated in an accommodating chamber 4J defined within the case 1J, and a differential transformer $10J_1$, $10J_2$ and permanent magnet $20J_1$, $20J_2$ disposed about the outer peripheral surface of the case 1J. A boundary between a pair of secondary coils $12J_1$ and $13J_1$ of one differential transformer $10J_1$ provides a reference position for one magnetic ball $5J_1$. Likewise, a boundary between a pair of secondary coils $12J_2$ and $13J_2$ of the other differential transformer $10J_2$ provides a reference position for the other magnetic ball $5J_2$. Both of the differential transformers $10J_1$ and $10J_2$ have a common primary coil 14J. The primary coil 14J may be composed of a pair of coil sections corresponding respectively to the two sensor units 61 and 62.

Figure 19:
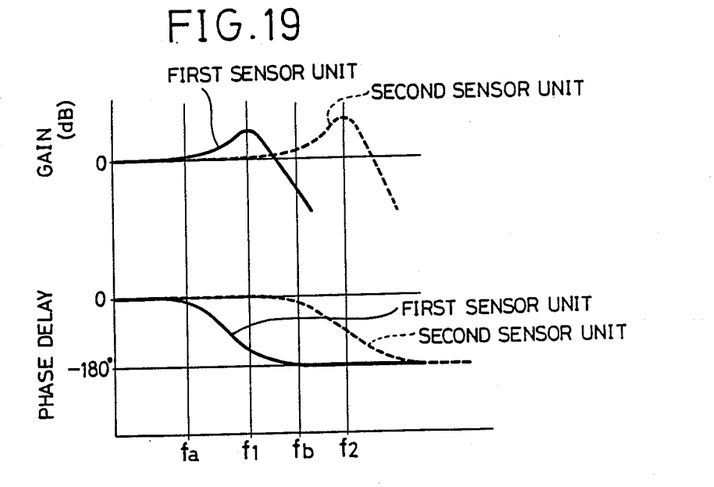
FIG. 19 is a graphical representation of the relationship between vibration frequency, and gain due to resonance and phase delay of each of the two sensor units illustrated in FIG. 18.

The two sensor units 61 and 62 have their respective frequency characteristics different from each other. That is, the permanent magnet $20J_2$ of the second sensor unit 62 generates a magnetic field stronger than that generated by the permanent magnet $20J_1$ of the first sensor unit 61. For this reason, as shown in FIG. 19, the second sensor unit 62 is higher in resonance frequency than the first sensor unit 61, so that the gain due to the resonance appears in a high range of frequency. Further, a phase delay occurs at a higher frequency, in the second sensor unit 62. In FIG. 19, the resonance frequencies of the respective sensor units 61 and 62 are designated respectively by the characters $f_1$ and $f_2$. When vibration occurs axially of the case 1J, the reciprocating stroke of the magnetic ball $5J_2$ in the second sensor unit 62 is shorter than that of the magnetic ball $5J_1$ in the first sensor unit 61. However, the secondary coils $12J_2$ and $13J_2$ of the second sensor unit 62 are more in winding number than the secondary coils $12J_1$ and $13J_1$ of the first sensor unit 61. Therefore, the detection outputs from the respective sensor units 61 and 62 are substantially equal to each other in a low range of frequency in which acceleration is nearly zero.

Figure 20:
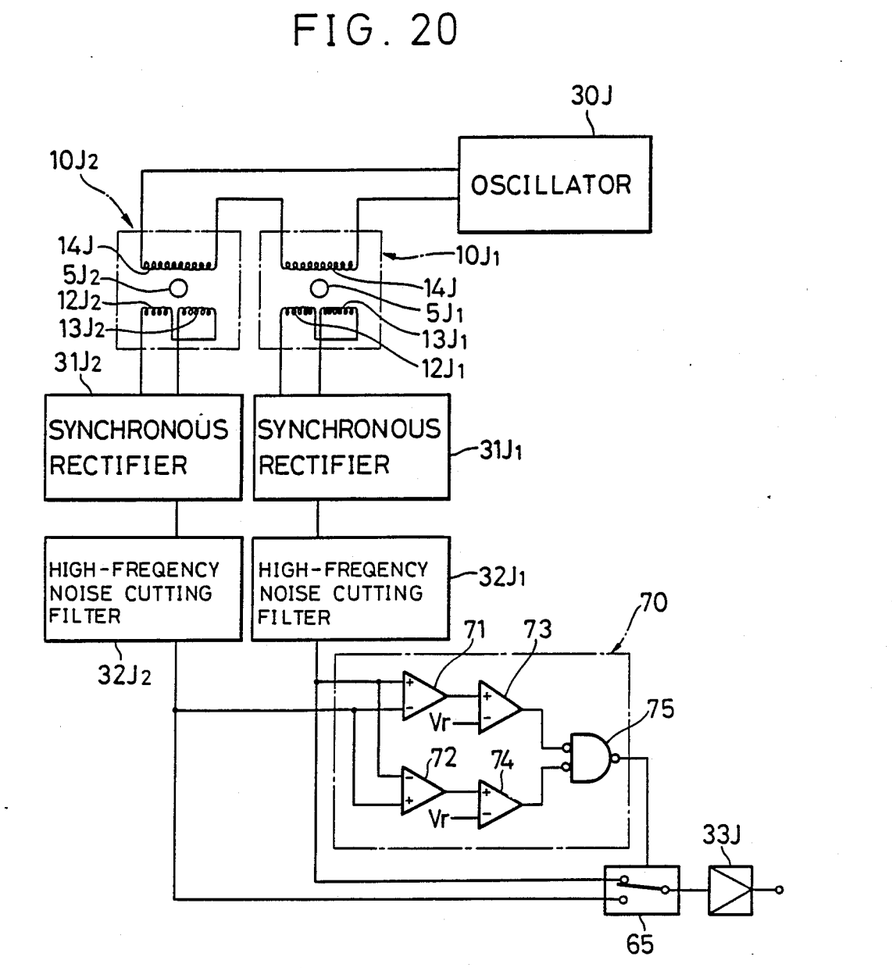
FIG. 20 is a block diagram of an electric circuit for use with the acceleration sensor illustrated in FIG. 18.

As shown in FIG. 20, the primary coil 14J of the differential transformers $10J_1$ and $10J_2$ is supplied with frequency considerably higher than vibration frequency, from an oscillator 30J. Differential outputs from the respective differential transformers $10J_1$ and $10J_2$ are inputted respectively to different input terminals of an analog switch 65 through respective synchronous rectifiers $31J_1$ and $31J_2$ and respective high-frequency noise cutting filters $32J_1$ and $32J_2$. Detection waves passing respectively through the high-frequency noise cutting filters $32J_1$ and $32J_2$ represent acceleration produced by axial vibration of the case 1J. The analog switch 65 selects one of the outputs from the respective sensor units 61 and 62 and sends the selected output to an amplifier 33J.

The selection operation of the analog switch 65 is effected, based on a signal from a selection command signal generator 70. In the signal generator 70, a pair of differential amplifiers 71 and 72 provide an output which corresponds to a difference between the detection outputs from the respective sensor units 61 and 62. Outputs from the respective differential amplifiers 71 and 72 are equal to each other in absolute value, and when one of the outputs is plus, the other output is minus. The outputs from the respective differential amplifiers 71 and 72 are sent respectively to comparators 73 and 74 and are compared thereby with a reference voltage Vr. If the vibration frequency is lower than fa (see FIG. 19), both of the outputs from the respective sensor units 61 and 62 are low in gain due to resonance, and also low in phase delay, so that the absolute value of the difference in level between the detection waves from the respective sensor units 61 and 62 is always lower than the reference voltage Vr. Accordingly, both of the output levels from the respective comparators 73 and 74 are "0" in logical value. These outputs are sent to a negative logic AND circuit 75, and the output level from the negative logic AND circuit 75 becomes "0" in logical value, to form a signal which causes the analog switch 65 to select the detection output from the first sensor unit 61. The first sensor unit 61 is relatively low in the magnetic force of the permanent magnet $20J_1$ and is long in the reciprocating stroke of the magnetic ball $5J_1$, so that the detection sensitivity of the first sensor unit 61 is good, as compared with the second sensor unit 62. Thus, selection of this detection output enables vibration to be detected highly accurately in a low range of frequency.

As the vibration frequency exceeds fa, the gain due to the resonance and the phase delay of the first sensor unit 61 increase, and a range appears in one period in which range the absolute value of the difference in level between the detection waves from the respective sensor units 61 and 62 exceeds the reference voltage Vr. In the range, any one of the output levels from the respective comparators 73 and 74 becomes "1" in logical value. Therefore, the output level from the negative logic AND circuit 75 becomes "1" in logical value, so that a signal is formed which causes the analog switch 65 to select the detection output from the second sensor unit 62. Since the second sensor unit 62 is low in the gain due to the resonance and the phase delay, it is possible to accurately detect the vibration even in a range of frequency higher than fa. The character fb in FIG. 19 represents a frequency at which the gain and phase delay in the detection output from the second sensor unit 62 exceeds an allowable limit.

In the embodiment illustrated in FIG. 18, the sensor units 61 and 62 may be different from each other in mass of their respective magnetic balls, to differ the resonance frequencies of the respective sensor units from each other.

Figures 21, 22, 23:
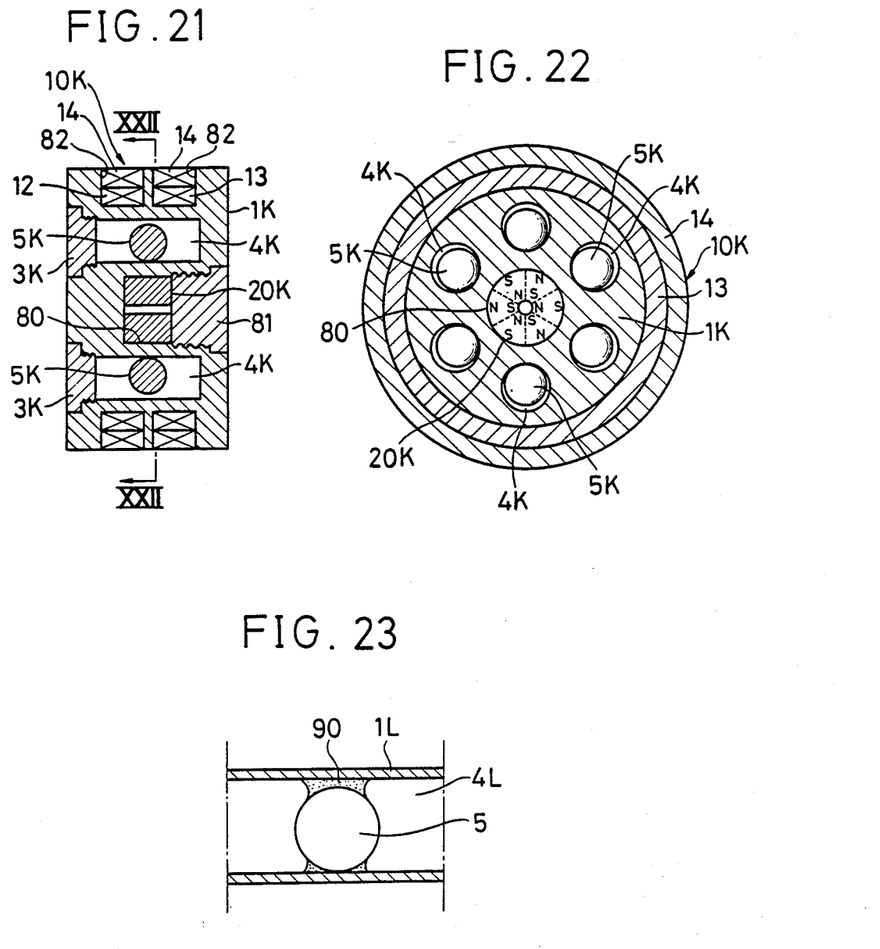
FIG. 21 is an axial cross-sectional view showing an eleventh embodiment of an acceleration sensor according to the invention.
FIG. 22 is a cross-sectional view taken along line XXII—XXII in FIG. 21.
FIG. 23 is a fragmental schematic view showing a twelfth embodiment of an acceleration sensor according to the invention.

FIGS. 21 and 22 show the eleventh embodiment of the invention, in which a case 1K is in the form of a low column, i.e., a drum, and a plurality of accommodating chambers 4k extending parallel to a central axis of the case 1 are arranged about the central axis. Magnetic balls 5K are accommodated respectively in the accommodating chambers 4K. The accommodating chambers 4K are spaced from each other circumferentially equidistantly. Open ends of the respective accommodating chambers 4K are closed by respective closures 3K. An axially extending accommodating chamber 80 having one closed end is formed at the center of the case 1K. A cylindrical permanent magnet 20K is accommodated in the accommodating chamber 80. The other open end of the accommodating chamber 80 is closed by a plug 81. A pair of circumferentially extending annular recesses 82 are formed in the outer peripheral surface of the case 1K. A differential transformer 10K similar to that of the first embodiment illustrated in FIG. 1 is mounted in the recesses 82. A boundary between secondary coils 12 and 13 of the differential transformer 10K is coincident with an axial center of a permanent magnet 20K to provide reference positions for the respective magnetic balls 5K. In the illustrated embodiment, the permanent magnet 20K is arranged radially inwardly of the magnetic balls 5K and can be located close to the same without interposition of the differential transformer 10K, so that the attracting force of the permanent magnet 20K acting on the balls 5K can further be strengthened. This makes it possible to widen a range of detection of acceleration, and to raise the resonance frequency. Further, the differential transformer 10K can be located close to the magnetic balls 5K, like all of the embodiments described previously, so that it is possible for the differential transformer 10K to increase the sensitivity in detection of the positions of the magnetic balls 5K. As indicated by the broken lines in FIG. 22, the permanent magnet 20K is divided into six magnetization regions magnetized radially. A boundary between each pair of magnetization regions opposite to each other in magnetic pole positions is located in conformity with the axis of a corresponding one of the accommodating chambers 4K, to strengthen the attracting force acting on the magnetic balls 5K. The permanent magnet 20K may have the entire outer peripheral side of one pole (N pole, for example) and the entire inner peripheral side of the other pole (S pole, for example).

FIG. 23 shows the twelfth embodiment of the invention, in which an accommodating chamber 4L defined in a case 1L contains a slight amount of magnetic fluid 90. The magnetic fluid 90 is attracted by a permanent magnet arranged on the outside of the case 1L, so that the magnetic fluid 90 extends in the form of an annulus about a periphery of a ball 5L. In this case a generally columnar magnet is formed by the magnetic ball 5L and the magnetic fluid 90, thereby making it possible to stabilize the magnetic flux. Further, since the small amount of magnetic fluid 90 moves always together with the magnetic ball 5L, movement of the magnetic ball 5L can be made smooth, if solvent having lubricating ability is used in the magnetic fluid 90. In the embodiment illustrated in FIG. 23, the magnetic fluid 90 is small in amount and follows the magnetic ball 5L, so that the magnetic fluid 90 does not substantially exert a bad influence on responsibility and reproducibility. Further, it is preferable for the embodiment that, since the accommodating chamber 4L is divided into two compartments by the magnetic ball 5L and the magnetic fluid 90, the accommodating chamber 4L is made negative in pressure or vacuum, or one or more bypass passages are provided, to make movement of the magnetic ball 5L and magnetic fluid 90 smooth. The arrangement illustrated in FIG. 23 is applicable to some of the embodiments described previously.

The invention should not be limited to the above-described specific forms, but any change, modifications and variations may be made to the invention. For example, the magnetic field generating means may be so arranged that at least one electromagnetic coil is disposed on the outer peripheral surface of the case in such a manner that the axis of the coil extends perpendicularly to the central axis of the case. The output from the differential transformer may be fed back to control supply voltage to the electromagnetic coil such that the magnetic field strength is varied to bring the output zero. The supply voltage to the electromagnetic coil is detected to measure acceleration.

Moreover, in all of the above-described embodiments except for the embodiment illustrated in FIGS. 21 and 22, the magnetic field generating means and the detecting coil means may be reversed in position such that the differential transformer is located radially outwardly and the magnetic field generating means is located radially inwardly.

Furthermore, although the above embodiments have been described as employing the differential transformer, a pair of coils may be substituted for the differential transformer, to detect a change in the self-inductance of the coils. Additionally, if it is not desired to detect the direction of acceleration, the self-inductance of a single detection coil may be utilized.

The central axis of the accommodating chamber may not necessarily be straight, but be curved.

What is claimed is:
1. An acceleration sensor comprising:
   a tabular case having an inner peripheral surface defining an accommodating chamber;
   at least one magnetic ball accommodated in said accommodating chamber with a radial play left between said magnetic ball and the inner peripheral surface of said case, said magnetic ball being movable axially of said accommodating chamber in point contact with the inner peripheral surface of said case;
   magnetic field generating means arranged on the outside of said case for magnetically attracting said magnetic ball to a reference position; and
   detection means arranged on the outside of said case for detecting a position of said magnetic ball for detecting axial displacement of said magnetic ball within said accommodating chamber in response to acceleration to which said case is subject, said detection means including a differential transformer arranged about an outer peripheral surface of said case, said differential transformer having a primary coil and a pair of secondary coils, said primary coil being connected to said supply source and being arranged in concentric relation to an axis of said accommodating chamber, said pair of secondary coils being arranged in concentric relation to said primary coil, said pair of secondary coils being arranged in coaxial relation to each other with said reference position located between said pair of secondary, coils wherein when said primary coil is supplied with the alternating voltage from said supply source, said pair of secondary coils generates a differential output representative of the axial displacement of said magnetic ball relative to the reference position.

2. An accelerations sensor as defined in claim 1, wherein said magnetic field generating means comprises a plurality of magnetic field generating regions arranged in the form of an annulus about said case, each of said magnetic field generating regions being magnetized radially in such a manner that one of each pair of adjacent regions has radially inward magnetic pole opposite to that of the other region.

3. An acceleration sensor as defined in claim 2, wherein said magnetic field generating means comprises a plurality of arcuate permanent magnet sections forming said magnetic field generating regions, respectively.

4. An acceleration sensor as defined in claim 2, wherein a central axis of a radial area of said accommodating chamber within said case, in which radial area said magnetic ball is movable radially, is displaced toward a specific one of boundaries between said magnetization regions.

5. An acceleration sensor as defined in claim 4, wherein said case has inner and outer peripheral surfaces which are circular in a plane perpendicular to an axis of said case, said case having a peripheral wall which is thinnest at a first position, is thickest at a second position angularly displaced 180 degrees from said first position, and gradually increases in thickness from said first position to said second position.

6. An acceleration sensor as defined in claim 4, wherein said case has at least one axially extending ridge formed on the inner surface of said case, to cause said ridge to restrict radial movement of said magnetic ball.

7. An acceleration sensor as defined in claim 1, wherein said accommodating chamber within said case is maximum in diameter at said reference position and gradually decreases in diameter at least in a region of a predetermined distance from said reference position as an axial distance from said reference position toward opposite ends of said case increases so that the inner surface of said case is inclined along the axis of said case in a symmetric fashion with respect to said reference position.

8. An acceleration sensor as defined in claim 4, wherein the inner surface of said case is coated with a thin film having low coefficient of friction.

9. An acceleration sensor as defined in claim 1, including a pair of shock absorbing members disposed respectively at opposite ends of said accommodating chamber.

10. An acceleration sensor as defined in claim 1, wherein said magnetic field generating means is arranged to occupy a peripherally partial region of an outer peripheral surface of said case, and said case has a pair of supports extending axially of said case and formed on the inner surface of said case, to support said magnetic ball attracted by said magnetic field generating means, in a point contact manner.

11. An acceleration sensor as defined in claim 10, wherein said case has a pair of ridges each having a triangular cross-sectional shape, said ridges having their respective ridgelines serving as said pair of supports for said magnetic ball.

12. An acceleration sensor as defined in claim 10, wherein the inner surface of said case has two flat planes on the side adjacent said magnetic field generating means, a part of each of said flat planes serving as a corresponding one of said pair of supports for said magnetic ball.

13. An acceleration sensor as defined in claim 1, including bypass passage means for communicating two compartments of said accommodating chamber with each other, said magnetic ball dividing said accommodating chamber into said two compartments, adjusting means for adjusting a cross-sectional communication area of said bypass passage means, and damping liquid filled in said accommodating chamber and said bypass passage means.

14. An acceleration sensor as defined in claim 13, wherein said bypass passage means is formed in said case, and said adjusting means comprises an adjust screw screwed into said case, said adjust screw having a forward end which adjusts the cross-sectional communication area of said bypass passage means.

15. An acceleration sensor as defined in claim 13, wherein sad bypass passage means comprises at least one bypass passage formed in said case, said bypass passage being capable of selectively receiving therein a rod serving as said adjusting means.

16. An acceleration sensor as defined in claim 1, including oil interposed between the inner surface of said case and said magnetic ball to divide said accommodating chamber filled with gas into two compartments, and gas communication means for communicating said two compartments with each other, said gas communication means being narrower in cross-sectional area than a gap between said case and said magnetic ball.

17. An acceleration sensor as defined in claim 16, wherein said gas communication means comprises at least one groove extending axially of said case and formed in the inner surface thereof.

18. An acceleration sensor as defined in claim 1, including at least one first sensor unit arranged adjacent longitudinal one end of said case, and at least one second sensor unit arranged adjacent the other longitudinal end of said case, each of said first and second sensor units comprising said magnetic ball, said magnetic field generating means and said detection means, said magnetic balls of the respective first and second sensor units being accommodated in said case, said detection means and said magnetic field generating means of the respective first and second sensor units being arranged about an outer peripheral surface of said case.

19. An acceleration sensor as defined in claim 18, including selection means for selecting any one of outputs from the respective first and second sensor units.

20. An acceleration sensor as defined in claim 19, wherein said selection means includes comparator means for comparing the outputs from the respective first and second sensor units with each other, said selection means effecting its selecting operation based on a comparison signal from said comparator means.

21. An acceleration sensor as defined in claim 18, wherein said magnetic field generating means of the respective first and second sensor units have their respective magnetic field strengths different from each other so that resonance frequencies of the respective first and second sensor units are different from each other.

22. An acceleration sensor as defined in claim 1, wherein said accommodating chamber contains magnetic fluid interposed between the inner surface of said case and said magnetic ball.

23. An acceleration sensor as defined in claim 1, wherein said accommodating chamber in said case has a circular cross-section constant in diameter along the axis of said accommodating chamber, said magnetic ball having its diameter slightly smaller than the diameter of said accommodating chamber.

24. An acceleration sensor as defined in claim 1, wherein the inner surface of said case is coated with a thin film having low coefficient of friction.

* * * * *

UNITED STATES PATENT AND TRADEMARK OFFICE
CERTIFICATE OF CORRECTION

PATENT NO. : 4,843,877

DATED : July 4, 1989

INVENTOR(S) : Takeo Kushida; Susumu TAira; Wataru Nagasaki; Hajime Muramatsu; and Toshikazu Sakakibara It is certified that error appears in the above-identified patent and that said Letters Patent is hereby corrected as shown below:

In column 12, line 48, after "position", the following paragraph should be added:

-- a supply source of alternating voltage; --

In column 12, line 65, the comma before "coils" should be put before "wherein".

Signed and Sealed this

First Day of January, 1991

Attest:

HARRY F. MANBECK, JR.

*Attesting Officer*     *Commissioner of Patents and Trademarks*